United States Patent
Ishikawa et al.

(10) Patent No.: US 12,423,085 B2
(45) Date of Patent: Sep. 23, 2025

(54) VEHICLE, INFORMATION PROCESSING DEVICE, NOTIFICATION SYSTEM, AND NON-TRANSITORY STORAGE MEDIUM

(71) Applicant: TOYOTA JIDOSHA KABUSHIKI KAISHA, Toyota (JP)

(72) Inventors: Tomoyasu Ishikawa, Nagoya (JP); Hiroshi Inoue, Nagoya (JP); Shunsuke Tanimori, Arlington, VA (US); Nana Kikuire, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 302 days.

(21) Appl. No.: 18/354,704

(22) Filed: Jul. 19, 2023

(65) Prior Publication Data

US 2024/0086171 A1  Mar. 14, 2024

(30) Foreign Application Priority Data

Sep. 12, 2022 (JP) .................................. 2022-144818

(51) Int. Cl.
  *G06F 8/65* (2018.01)
  *B60W 50/08* (2020.01)
(52) U.S. Cl.
  CPC .............. *G06F 8/65* (2013.01); *B60W 50/08* (2013.01)
(58) Field of Classification Search
  None
  See application file for complete search history.

(56) References Cited

U.S. PATENT DOCUMENTS

| | | | |
|---|---|---|---|
| 11,630,894 B2* | 4/2023 | Hasegawa | G06F 21/305 |
| | | | 726/17 |
| 2009/0235244 A1* | 9/2009 | Enomori | H04L 67/34 |
| | | | 717/170 |
| 2018/0217786 A1* | 8/2018 | Sakai | G06F 3/1288 |
| 2019/0230190 A1* | 7/2019 | Noguchi | H04L 67/1001 |
| 2022/0342651 A1* | 10/2022 | Ishikawa | B60W 50/06 |
| 2022/0405083 A1* | 12/2022 | Ishikawa | G06F 8/65 |

FOREIGN PATENT DOCUMENTS

| | | | |
|---|---|---|---|
| JP | 2010186258 A | * | 8/2010 |
| JP | 2017149323 A | | 8/2017 |

* cited by examiner

*Primary Examiner* — Philip Wang
(74) *Attorney, Agent, or Firm* — Dickinson Wright, PLLC

(57) ABSTRACT

A vehicle equipped with an electronic control unit includes: one or more communication devices configured to receive from a server an approval request to a user regarding update of software used in the electronic control unit; and one or more processors configured to receive a predetermined vehicle-side operation for the approval request, perform control for notifying, to an information processing device of the user, a vehicle-side operation result of the predetermined vehicle-side operation without going through the server when the predetermined vehicle-side operation is received, and perform control for withdrawing the approval request received by the one or more communication devices when the vehicle receives from the information processing device a device-side operation result of a predetermined device-side operation. The predetermined device-side operation is an operation received in the information processing device and is an operation for the approval request transmitted from the server to the information processing device.

11 Claims, 3 Drawing Sheets

VEHICLE, INFORMATION PROCESSING DEVICE, NOTIFICATION SYSTEM, AND NON-TRANSITORY STORAGE MEDIUM

CROSS-REFERENCE TO RELATED APPLICATION

This application claims priority to Japanese Patent Application No. 2022-144818 filed on Sep. 12, 2022, incorporated herein by reference in its entirety.

BACKGROUND

1. Technical Field

The present disclosure relates to a vehicle, an information processing device, a notification system, and a non-transitory storage medium.

2. Description of Related Art

Japanese Unexamined Patent Application Publication No. 2017-149323 (JP 2017-149323 A) discloses a vehicle control device that downloads update software (for a vehicle electronic control device (ECU)) transmitted from a server via a user's mobile device. Here, there is a case where an approval request regarding update of software is transmitted from the server to each of a vehicle and the mobile device.

SUMMARY

As described above, when the approval request regarding the update of the software is transmitted from the server to each of the vehicle and the mobile device (information processing device), it is considered that it is difficult to synchronize operation results (obtain a common operation result) for the approval request between the vehicle and the mobile device. Therefore, when the approval request regarding the update of the software used in the vehicle ECU is transmitted to each of the vehicle and the information processing device, it is desired to synchronize the operation results (obtain the common operation result) for the approval request between the vehicle and the information processing device.

The present disclosure provides a vehicle, an information processing device, a notification system, and a non-transitory storage medium capable of synchronizing the operation results (obtaining the common operation result) for the approval request between the vehicle and the information processing device when the approval request regarding the update of the software used in the vehicle ECU is transmitted to each of the vehicle and the information processing device.

A vehicle according to a first aspect of the present disclosure is a vehicle equipped with an electronic control unit, and includes: one or more communication devices configured to receive from a server an approval request to a user regarding update of software used in the electronic control unit; and one or more processors configured to receive a predetermined vehicle-side operation for the approval request, perform control for notifying, to an information processing device of the user different from the vehicle, a vehicle-side operation result of the predetermined vehicle-side operation without going through the server when the predetermined vehicle-side operation is received, and perform control for withdrawing the approval request received by the one or more communication devices when the vehicle receives from the information processing device a device-side operation result of a predetermined device-side operation. The predetermined device-side operation is an operation received in the information processing device and is an operation for the approval request transmitted from the server to the information processing device.

An information processing device according to a second aspect of the present disclosure includes: one or more communication devices configured to receive from a server an approval request to a user regarding update of software used in an electronic control unit of a vehicle; and one or more processors configured to receive a predetermined device-side operation for the approval request, perform control for notifying the vehicle of a device-side operation result of the predetermined device-side operation without going through the server when the predetermined device-side operation is received, and perform control for withdrawing the approval request received by the one or more communication devices when the information processing device receives from the vehicle a vehicle-side operation result of a predetermined vehicle-side operation. The predetermined vehicle-side operation is an operation received in the vehicle and is an operation for the approval request transmitted from the server to the vehicle.

A notification system according to a third aspect of the present disclosure is a notification system for notifying an approval request to a user regarding update of software to an electronic control unit installed in a vehicle, and includes: the vehicle; an information processing device; and a server that transmits the approval request to each of the vehicle and the information processing device. One of the vehicle and the information processing device is configured to, when a predetermined operation for the approval request is received, transmit an operation result of the predetermined operation to the other of the vehicle and the information processing device without going through the server. The other of the vehicle and the information processing device is configured to, when the operation result from the one of the vehicle and the information processing device is received, perform control for withdrawing the approval request received by the other of the vehicle and the information processing device.

According to the present disclosure, when the approval request regarding the update of the software used in the electronic control unit of the vehicle is transmitted to each of the vehicle and the information processing device, it is possible to synchronize the operation results (obtain the common operation result) for the approval request between the vehicle and the information processing device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
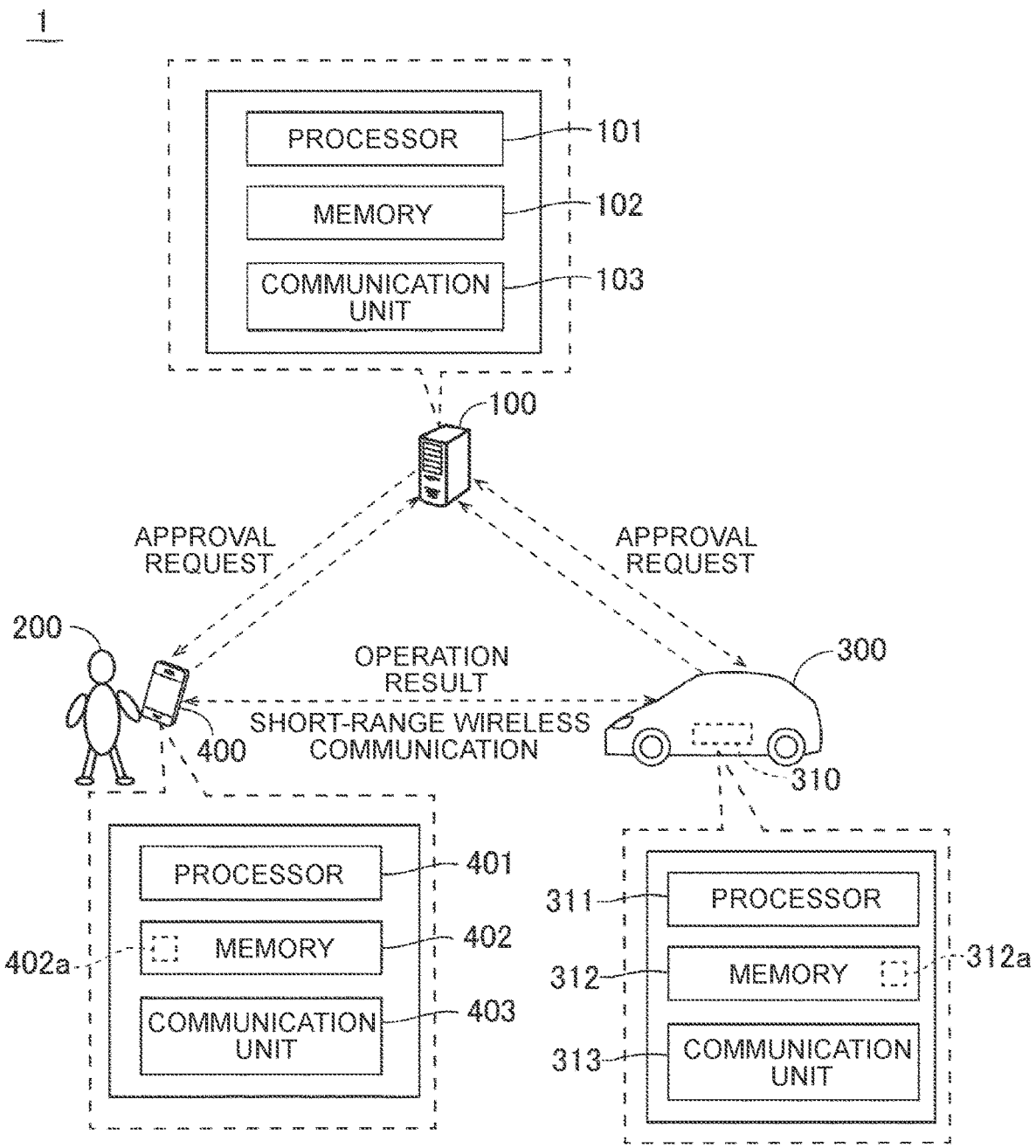
FIG. 1 is a diagram showing a configuration of a notification system according to an embodiment.

Hereinafter, an embodiment of the present disclosure will be described in detail with reference to the drawings. The same or corresponding parts in the drawings are denoted by the same reference signs, and the description thereof will not be repeated.

FIG. 1 is a diagram showing a configuration of a notification system 1 according to the embodiment. The notification system 1 includes a server 100, a vehicle 300 of a user 200, and a mobile terminal 400 of the user 200. The mobile terminal 400 includes a smartphone or the like. The mobile terminal 400 is an example of an "information processing device" according to the present disclosure.

The server 100 includes a processor (or two or more processors) 101, a memory (or two or more memories) 102, and a communication unit (or two or more communication units) 103. The processor 101 controls the communication unit 103. The memory 102 stores a program to be executed by the processor 101 as well as information used in the program (for example, maps, formulas, and various parameters). The communication unit 103 includes various communication interfaces (I/Fs), and is also referred to as a communication device.

The vehicle 300 is equipped with an electronic control unit (ECU) 310. The ECU 310 includes a processor (or two or more processors) 311, a memory (or two or more memories) 312, and a communication unit (or two or more communication units) 313. The memory 312 stores a program to be executed by the processor 311 as well as information used in the program (for example, maps, formulas, and various parameters). The communication unit 313 includes various communication I/Fs, and is also referred to as a communication device. The communication unit 313 may include a data communication module (DCM), or may include a communication OF compatible with a fifth generation mobile communication system (5G). The processor 311 and the communication unit 313 are examples of a "vehicle control unit" and a "vehicle reception unit" according to the present disclosure, respectively.

The mobile terminal 400 includes a processor (or two or more processors) 401, a memory (or two or more memories) 402, and a communication unit (or two or more communication units) 403. The memory 402 stores a program to be executed by the processor 401 as well as information used in the program (for example, maps, formulas, and various parameters). The communication unit 403 includes various communication I/Fs, and is also referred to as a communication device. The processor 401 and the communication unit 403 are examples of a "device control unit" and a "device reception unit" according to the present disclosure, respectively.

The processor 101 of the server 100 controls update of software used in the ECU 310. The processor 101 transmits software of a new version to the communication unit 313 of the ECU 310 through the communication unit 103. Then, the processor 311 of the ECU 310 installs the received software and updates the software.

Here, in the present embodiment, the server 100 (processor 101) transmits an approval request to the user 200 regarding the update of the software to each of the ECU 310 (communication unit 313) and the mobile terminal 400 (communication unit 403) through the communication unit 103.

The processor 311 of the ECU 310 can receive an operation by the user 200 for the approval request. For example, the processor 311 receives the operation by the user 200 for the approval request based on the operation by the user 200 on a human machine interface (HMI) of the vehicle 300 or the like. In the vehicle 300, the approval request is transmitted to the user 200 via the HMI. Further, the operation in the vehicle 300 is an example of a "vehicle-side operation" according to the present disclosure.

When the operation by the user 200 in the vehicle 300 is received, the processor 311 of the ECU 310 performs control for notifying the mobile terminal 400 of an operation result of the operation without going through the server 100. In other words, when the operation by the user 200 in the vehicle 300 is received, the processor 311 performs control for directly notifying the mobile terminal 400 of the operation result. The operation result in the vehicle 300 is an example of a "vehicle-side operation result" according to the present disclosure.

The processor 311 of the ECU 310 performs control for notifying the mobile terminal 400 of the operation result in the vehicle 300 by short-range communication (short-range wireless communication). Specifically, the processor 311 performs control for transmitting the operation result to the communication unit 403 of the mobile terminal 400 by the short-range communication through the communication unit 313.

The processor 401 of the mobile terminal 400 can receive the operation by the user 200 for the approval request. For example, the processor 401 receives the operation by the user 200 for the approval request based on the operation by the user 200 in the mobile terminal 400. The operation in the mobile terminal 400 is an example of a "device-side operation" according to the present disclosure.

When the operation in the mobile terminal 400 is received, the processor 401 of the mobile terminal 400 performs control for notifying the vehicle 300 of the operation result of the operation without going through the server 100. In other words, when the operation by the user 200 in the mobile terminal 400 is received, the processor 401 performs control for directly notifying the vehicle 300 of the operation result. The operation result in the mobile terminal 400 is an example of a "device-side operation result" according to the present disclosure.

Further, the processor 401 of the mobile terminal 400 performs control for communicating the operation result in the mobile terminal 400 to the vehicle 300 by the short-range communication. Specifically, the processor 401 performs control for transmitting the operation result to the communication unit 313 of the ECU 310 by the short-range communication through the communication unit 403.

Here, in a system of the related art, it is difficult to synchronize the operation results (obtain the common result) for the approval request between the vehicle 300 and the mobile terminal 400. A system capable of easily synchronizing the operation results (obtaining the common result) for the approval request between the vehicle 300 and the mobile terminal 400 is desired.

Therefore, in the present embodiment, when the operation by the user 200 for the approval request is received in the mobile terminal 400, and the operation result of the operation is transmitted from the mobile terminal 400 to the vehicle 300, the processor 311 of the ECU 310 performs control for withdrawing the approval request received by the communication unit 313 of the ECU 310. The control for withdrawing the approval request may include control for erasing a signal (data) including the approval request received by the vehicle 300 from the server 100.

The control (withdrawal control) in the processor 311 of the ECU 310 is performed by the processor 311 reading and executing a program 312a stored in the memory 312. Although the program 312a itself does not physically exist, the program in the memory 312 is indicated by a reference sign (312a) in FIG. 1 for easy understanding.

Further, the processor 311 of the ECU 310 performs control for transmitting the operation result transmitted from the mobile terminal 400 to the server 100 (communication unit 103). In other words, the server 100 (communication unit 103) receives the operation result from the mobile terminal 400 via the communication unit 313 of the vehicle 300.

Further, when the operation by the user 200 for the approval request is received in the vehicle 300, and the operation result of the operation is transmitted from the vehicle 300 to the mobile terminal 400, the processor 401 of the mobile terminal 400 performs control for withdrawing the approval request received by the communication unit 403 of the mobile terminal 400. The control for withdrawing the approval request may include control for erasing a signal (data) including the approval request received by the mobile terminal 400 from the server 100.

The control (withdrawal control) in the processor 401 of the mobile terminal 400 is performed by the processor 401 reading and executing a program 402a stored in the memory 402. Although the program 402a itself does not physically exist, the program in the memory 402 is indicated by a reference sign (402a) in FIG. 1 for easy understanding.

Further, the processor 401 of the mobile terminal 400 performs control for transmitting the operation result transmitted from the vehicle 300 to the server 100 (communication unit 103). In other words, the server 100 (communication unit 103) receives the operation result from the vehicle 300 via the communication unit 403 of the mobile terminal 400.

Notification Control Method in Vehicle

Figure 2:
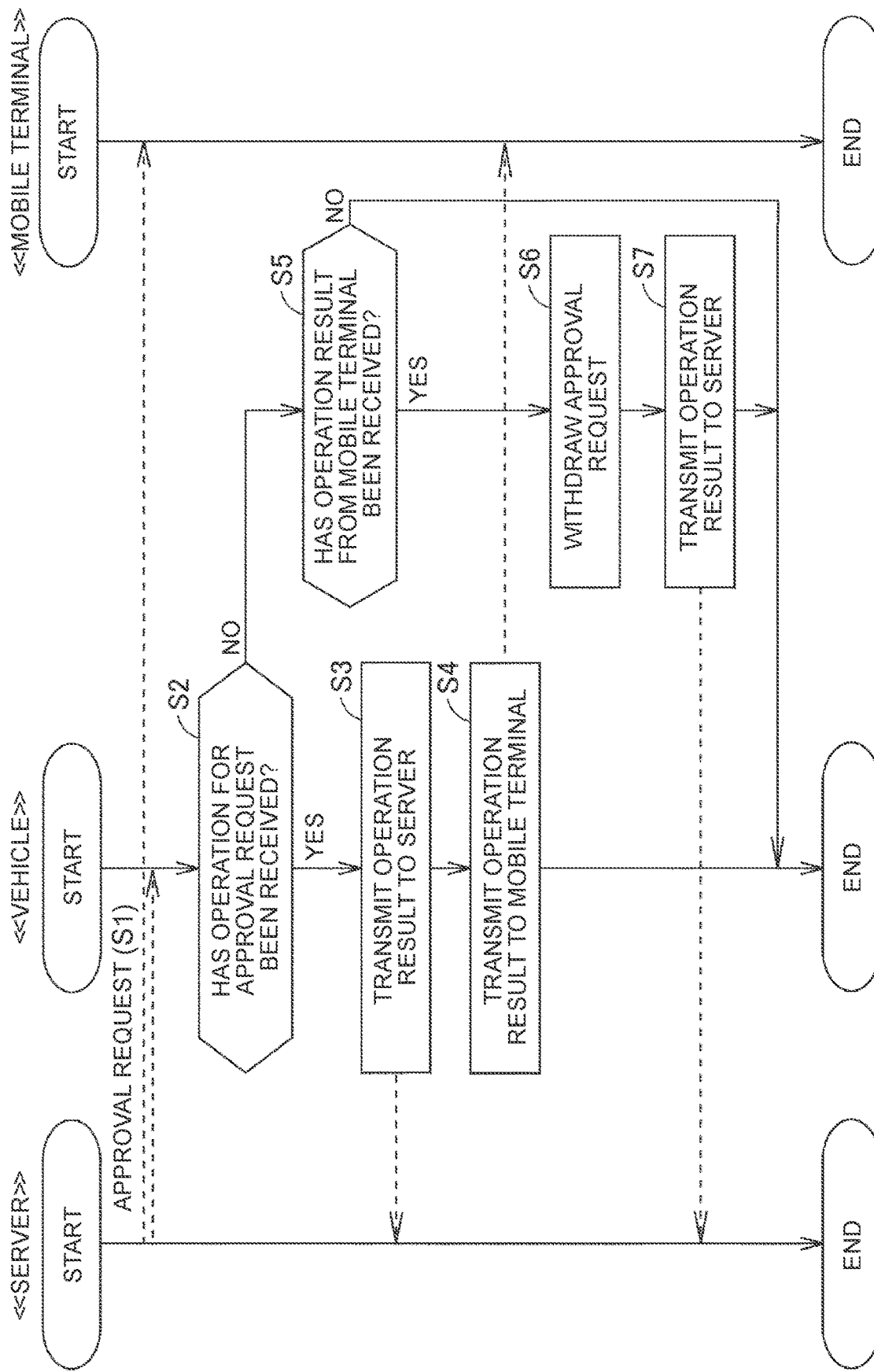
FIG. 2 is a sequence diagram showing a notification control method in a vehicle according to the embodiment.

Next, a notification control method in the vehicle 300 will be described with reference to a sequence diagram of FIG. 2.

First, in step S1, the server 100 transmits the approval request regarding the update of the software used in the ECU 310 to each of the vehicle 300 and the mobile terminal 400 through the communication unit 103.

In step S2, the processor 311 of the ECU 310 determines whether the operation by the user 200 for the approval request transmitted from the server 100 to the vehicle 300 in step S1 has been received. When the processor 311 has received the operation by the user 200 (Yes in S2), the process proceeds to step S3. When the processor 311 has not received the operation by the user 200 (No in S2), the process proceeds to step S5.

In step S3, the processor 311 of the ECU 310 transmits to the server 100 through the communication unit 313 the operation result of the operation by the user 200 received by the processor 311 in step S2.

In step S4, the processor 311 of the ECU 310 transmits the operation result corresponding to step S2 to the communication unit 403 of the mobile terminal 400 through the communication unit 313 without going through the server 100. The process of step S3 and the process of step S4 may be performed simultaneously, or the process of step S4 may be performed first.

In step S5, the processor 311 of the ECU 310 determines whether the operation result of the operation by the user 200 for the approval request in the mobile terminal 400 has been received. When the processor 311 has received the operation result from the mobile terminal 400, the process proceeds to step S6. When the processor 311 has not received the operation result from the mobile terminal 400, the process ends. The determination of step S5 means determination of whether the process of step S14 (see FIG. 3), which will be described later, has been completed.

In step S6, the processor 311 of the ECU 310 performs a process of withdrawing the approval request transmitted from the server 100 to the vehicle 300.

In step S7, the processor 311 of the ECU 310 transmits to the server 100 through the communication unit 313 the operation result transmitted from the mobile terminal 400 (the operation result of the operation by the user 200 in the mobile terminal 400). Thereby, the server 100 receives the operation result from both the vehicle 300 and the mobile terminal 400 (see S13 in FIG. 3 described later).

Notification Control Method in Mobile Terminal

Figure 3:
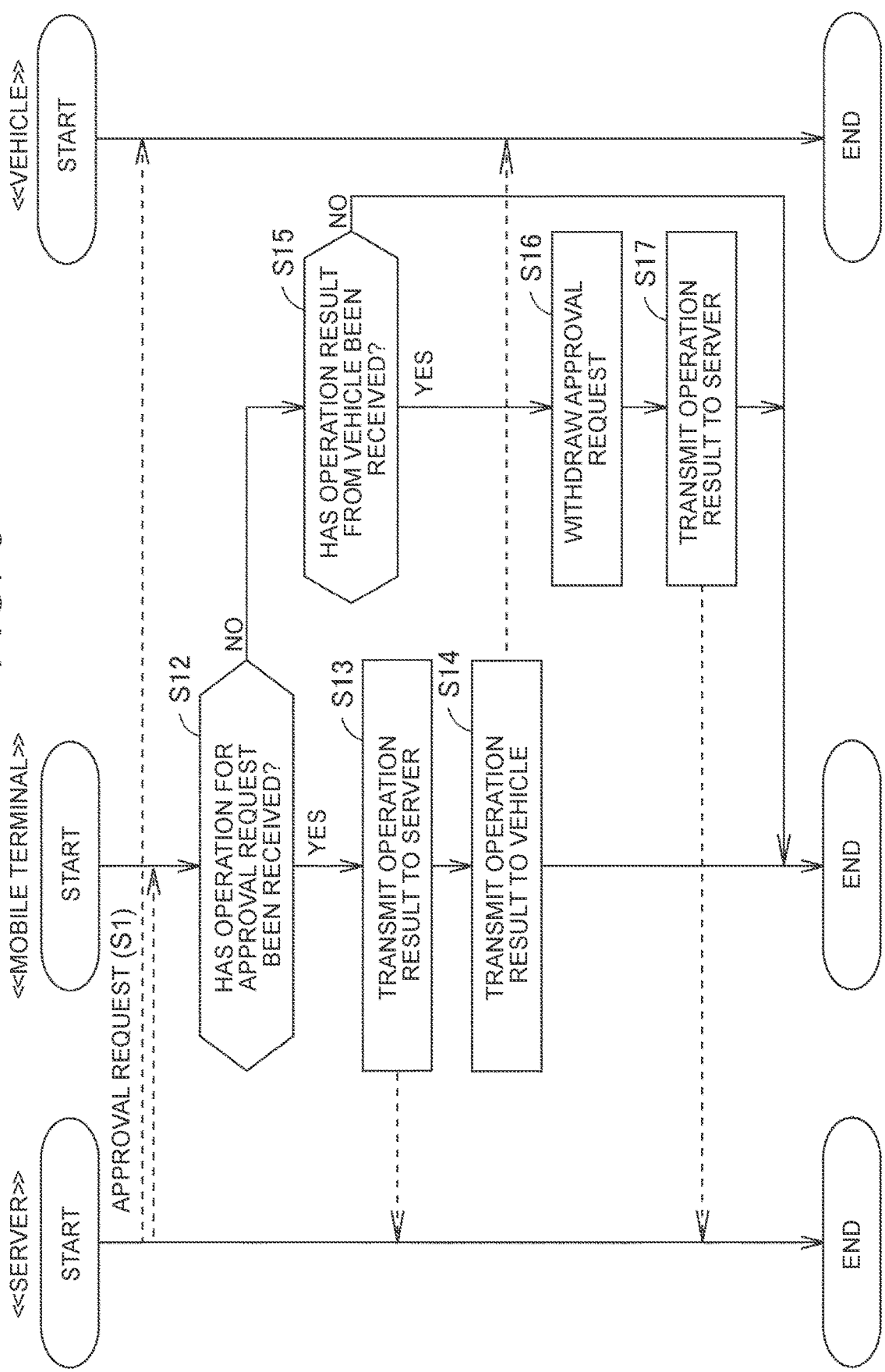
FIG. 3 is a sequence diagram showing a notification control method in a mobile terminal according to the embodiment.

Next, a notification control method in the mobile terminal 400 will be described with reference to a sequence diagram of FIG. 3. The steps of the same processes as in FIG. 2 are denoted by the same reference signs as in FIG. 2, and will not be described repeatedly.

In step S12, the processor 401 of the mobile terminal 400 determines whether the operation by the user 200 for the approval request transmitted from the server 100 to the mobile terminal 400 in step S1 has been received. When the processor 401 has received the operation by the user 200 (Yes in S12), the process proceeds to step S13. When the processor 401 has not received the operation by the user 200 (No in S12), the process proceeds to step S15.

In step S13, the processor 401 of the mobile terminal 400 transmits to the server 100 through the communication unit 403 the operation result of the operation by the user 200 received by the processor 401 in step S12.

In step S14, the processor 401 of the mobile terminal 400 transmits the operation result corresponding to step S12 to the communication unit 313 of the ECU 310 through the communication unit 403 without going through the server 100. The process of step S13 and the process of step S14 may be performed simultaneously, or the process of step S14 may be performed first.

In step S15, the processor 401 of the mobile terminal 400 determines whether the operation result of the operation by the user 200 for the approval request in the vehicle 300 has been received. When the processor 401 has received the operation result from the vehicle 300, the process proceeds to step S16. When the processor 401 has not received the operation result from the vehicle 300, the process ends. The determination of step S15 means determination of whether the process of step S4 in FIG. 2 has been completed.

In step S16, the processor 401 of the mobile terminal 400 performs a process of withdrawing the approval request transmitted from the server 100 to the mobile terminal 400.

In step S17, the processor 401 of the mobile terminal 400 transmits to the server 100 through the communication unit 403 the operation result transmitted from the vehicle 300 (the operation result of the operation by the user 200 in the vehicle 300). Thereby, the server 100 receives the operation result from both the vehicle 300 (see S3 in FIG. 2) and the mobile terminal 400.

As described above, in the present embodiment, when a predetermined operation for the approval request is received, one of the vehicle 300 and the mobile terminal 400 transmits the operation result of the predetermined operation to the other of the vehicle 300 and the mobile terminal 400 without going through the server 100. Then, when the operation result from the one of the vehicle 300 and the mobile terminal 400 is received, the other of the vehicle 300 and the mobile terminal 400 performs control for withdrawing the approval request received by the other of the vehicle 300 and the mobile terminal 400. As a result, the operations (operation results) for the approval request can be synchronized (the common operation result can be obtained)

between the vehicle 300 and the mobile terminal 400. Further, the operation result is transmitted from the one of the vehicle 300 and the mobile terminal 400 to the other of the vehicle 300 and the mobile terminal 400 without going through the server 100, so that it is possible to shorten the time required for synchronizing the operation results between the vehicle 300 and the mobile terminal 400.

In the above-described embodiment, an example in which the approval request from the server 100 is transmitted to the vehicle 300 and the mobile terminal 400 has been described, but the present disclosure is not limited to this. The approval request may be transmitted to the vehicle 300 and a stationary user terminal such as a personal computer.

In the above-described embodiment, an example in which the operation result is transmitted and received between the vehicle 300 and the mobile terminal 400 by the short-range communication has been described, but the present disclosure is not limited to this. The operation result may be transmitted and received between the vehicle 300 and the mobile terminal 400 by long-range communication. Further, the operation result may be transmitted and received between the vehicle 300 and the mobile terminal 400 by wired communication.

In the above-described embodiment, an example in which the vehicle 300 transmits the operation result transmitted from the mobile terminal 400 to the server 100 has been described, but the present disclosure is not limited to this. The vehicle 300 may not transmit the operation result transmitted from the mobile terminal 400 to the server 100. Similarly, the mobile terminal 400 may not transmit the operation result transmitted from the vehicle 300 to the server 100.

The embodiments disclosed herein should be considered as exemplary in all respects and not restrictive. The scope of the present disclosure is indicated by the claims rather than the description of the embodiments above, and is intended to include all modifications within the meaning and scope equivalent to the scope of the claims.

A vehicle according to a first aspect of the present disclosure is a vehicle equipped with an electronic control unit, and includes: one or more communication devices configured to receive from a server an approval request to a user regarding update of software used in the electronic control unit; and one or more processors configured to receive a predetermined vehicle-side operation for the approval request, perform control for notifying, to an information processing device of the user different from the vehicle, a vehicle-side operation result of the predetermined vehicle-side operation without going through the server when the predetermined vehicle-side operation is received, and perform control for withdrawing the approval request received by the one or more communication devices when the vehicle receives from the information processing device a device-side operation result of a predetermined device-side operation. The predetermined device-side operation is an operation received in the information processing device and is an operation for the approval request transmitted from the server to the information processing device.

With the first aspect according to the present disclosure, when the predetermined device-side operation for the approval request is received in the information processing device, and the device-side operation result of the device-side operation is transmitted from the information processing device to the vehicle, control for withdrawing the approval request received by the one or more communication devices is performed. Thereby, the approval request to the vehicle is withdrawn based on the fact that the vehicle has received the device-side operation result, so that the operation for the approval request is suppressed from being performed in the vehicle. As a result, it is possible to suppress in the vehicle an operation different from the device-side operation from being performed in response to the approval request. As a result, the operation results for the approval request can be synchronized (the common operation result can be obtained) between the vehicle and the information processing device.

In the first aspect described above, the one or more processors may be configured to perform the control for notifying the information processing device of the vehicle-side operation result by short-range communication. With this configuration, the vehicle-side operation result can be notified to the information processing device more easily than when the vehicle-side operation result is notified to the information processing device by wired communication.

In the first aspect described above, the one or more processors may be configured to perform control for transmitting the device-side operation result transmitted from the information processing device to the server. With this configuration, the server can reliably acquire the device-side operation result.

In the first aspect described above, the control for withdrawing the approval request may include control for erasing a signal including the approval request received by the one or more communication devices.

An information processing device according to a second aspect of the present disclosure includes: one or more communication devices configured to receive from a server an approval request to a user regarding update of software used in an electronic control unit of a vehicle; and one or more processors configured to receive a predetermined device-side operation for the approval request, perform control for notifying the vehicle of a device-side operation result of the predetermined device-side operation without going through the server when the predetermined device-side operation is received, and perform control for withdrawing the approval request received by the one or more communication devices when the information processing device receives from the vehicle a vehicle-side operation result of a predetermined vehicle-side operation. The predetermined vehicle-side operation is an operation received in the vehicle and is an operation for the approval request transmitted from the server to the vehicle.

With the second aspect according to the present disclosure, when the predetermined vehicle-side operation for the approval request is received in the vehicle, and the vehicle-side operation result of the vehicle-side operation is transmitted from the vehicle to the information processing device, control for withdrawing the approval request received by the one or more communication devices is performed. Thereby, the approval request to the information processing device is withdrawn based on the fact that the information processing device has received the vehicle-side operation result, so that the operation for the approval request is suppressed from being performed in the information processing device. As a result, it is possible to suppress in the information processing device an operation different from the vehicle-side operation from being performed in response to the approval request. As a result, it is possible to provide the information processing device capable of synchronizing the operation results (obtaining the common operation result) for the approval request between the vehicle and the information processing device.

In the second aspect described above, the one or more processors may be configured to perform the control for notifying the vehicle of the device-side operation result by short-range communication. With this configuration, the device-side operation result can be notified to the vehicle more easily than when the device-side operation result is notified to the vehicle by wired communication.

In the second aspect described above, the one or more processors may be configured to perform control for transmitting the vehicle-side operation result transmitted from the vehicle to the server. With this configuration, the server can reliably acquire the vehicle-side operation result.

In the second aspect described above, the control for withdrawing the approval request may include control for erasing a signal including the approval request received by the one or more communication devices.

A notification system according to a third aspect of the present disclosure is a notification system for notifying an approval request to a user regarding update of software to an electronic control unit installed in a vehicle, and includes: the vehicle; an information processing device; and a server that transmits the approval request to each of the vehicle and the information processing device. One of the vehicle and the information processing device is configured to, when a predetermined operation for the approval request is received, transmit an operation result of the predetermined operation to the other of the vehicle and the information processing device without going through the server. The other of the vehicle and the information processing device is configured to, when the operation result from the one of the vehicle and the information processing device is received, perform control for withdrawing the approval request received by the other of the vehicle and the information processing device.

According to the third aspect of the present disclosure, when the operation result from the one of the vehicle and the information processing device is received, the other of the vehicle and the information processing device performs control for withdrawing the approval request received by the other of the vehicle and the information processing device. As a result, it is possible to provide the notification system capable of synchronizing the operation results (obtaining the common operation result) for the approval request between the vehicle and the information processing device.

A notification control method according to a fourth aspect of the present disclosure is a notification control method in a vehicle of a user equipped with an electronic control unit, and includes: a process of receiving from a server an approval request to the user regarding update of software used in the electronic control unit; a process of receiving a predetermined vehicle-side operation for the approval request; a process of notifying an information processing device of the user of a vehicle-side operation result of the vehicle-side operation without going through the server; and a process of withdrawing the approval request that has been received, when a predetermined device-side operation for the approval request is received in the information processing device, and an device-side operation result of the device-side operation is transmitted from the information processing device to the vehicle.

With the fourth aspect according to the present disclosure, when the predetermined device-side operation for the approval request is received in the information processing device, and the device-side operation result of the device-side operation is transmitted from the information processing device to the vehicle, control for withdrawing the approval request received by the one or more communication devices is performed. As a result, it is possible to provide the notification control method capable of synchronizing the operation results (obtaining the common operation result) for the approval request between the vehicle and the information processing device.

A notification control method according to a fifth aspect of the present disclosure is a notification control method in an information processing device of a user, and includes: a process of receiving from a server an approval request to the user regarding update of software used in an electronic control unit of a vehicle of the user; a process of receiving a predetermined device-side operation for the approval request; a process of notifying the vehicle of a device-side operation result of the device-side operation without going through the server; and a process of withdrawing the approval request that has been received, when a predetermined vehicle-side operation for the approval request is received in the vehicle, and a vehicle-side operation result of the vehicle-side operation is transmitted from the vehicle to the information processing device.

With the fifth aspect according to the present disclosure, when the predetermined vehicle-side operation for the approval request is received in the vehicle, and the vehicle-side operation result of the vehicle-side operation is transmitted from the vehicle to the information processing device, control for withdrawing the approval request received by the one or more communication devices is performed. As a result, it is possible to provide the information processing device capable of synchronizing the operation results (obtaining the common operation result) for the approval request between the vehicle and the information processing device.

A notification control method according to a sixth aspect of the present disclosure is a notification control method by a notification system that notifies an approval request to a user regarding update of software to an electronic control unit installed in a vehicle, and includes: a process in which a server transmits an approval request to each of the vehicle of the user and an information processing device of the user; a process in which one of the vehicle and the information processing device receives a predetermined operation for the approval request; and a process in which the one of the vehicle and the information processing device transmits an operation result of the predetermined operation to another of the vehicle and the information processing device without going through the server, and a process in which the other of the vehicle and the information processing device withdraws the approval request that has been received.

With the sixth aspect according to the present disclosure, when the other of the vehicle and the information processing device receives the operation result from the one of the vehicle and the information processing device, the other of the vehicle and the information processing device performs control for withdrawing the approval request received by the other of the vehicle and the information processing device. As a result, it is possible to provide the notification control method capable of synchronizing the operation results (obtaining the common operation result) for the approval request between the vehicle and the information processing device.

What is claimed is:

1. A vehicle equipped with an electronic control unit, the vehicle comprising:
   one or more communication devices configured to receive from a server an approval request to a user regarding update of software used in the electronic control unit; and
   one or more processors configured to receive a predetermined vehicle-side operation for the approval request, perform control for notifying, to an information processing device of the user different from the vehicle, a vehicle-side operation result of the predetermined vehicle-side operation without going through the server when the predetermined vehicle-side operation is received, and perform control for withdrawing the approval request received by the one or more communication devices when the vehicle receives from the information processing device a device-side operation result of a predetermined device-side operation, the predetermined device-side operation being an operation received in the information processing device and being an operation for the approval request transmitted from the server to the information processing device.

2. The vehicle according to claim 1, wherein the one or more processors are configured to perform the control for notifying the information processing device of the vehicle-side operation result by short-range communication.

3. The vehicle according to claim 1, wherein the one or more processors are configured to perform control for transmitting the device-side operation result transmitted from the information processing device to the server.

4. The vehicle according to claim 1, wherein the control for withdrawing the approval request includes control for erasing a signal including the approval request received by the one or more communication devices.

5. An information processing device comprising:
one or more communication devices configured to receive from a server an approval request to a user regarding update of software used in an electronic control unit of a vehicle; and one or more processors configured to
receive a predetermined device-side operation for the approval request, perform control for notifying the vehicle of a device-side operation result of the predetermined device-side operation without going through the server when the predetermined device-side operation is received, and perform control for withdrawing the approval request received by the one or more communication devices when the information processing device receives from the vehicle a vehicle-side operation result of a predetermined vehicle-side operation, the predetermined vehicle-side operation being an operation received in the vehicle and being an operation for the approval request transmitted from the server to the vehicle.

6. The information processing device according to claim 5, wherein the one or more processors are configured to perform the control for notifying the vehicle of the device-side operation result by short-range communication.

7. The information processing device according to claim 5, wherein the one or more processors are configured to perform control for transmitting the vehicle-side operation result transmitted from the vehicle to the server.

8. The information processing device according to claim 5, wherein the control for withdrawing the approval request includes control for erasing a signal including the approval request received by the one or more communication devices.

9. A notification system for notifying an approval request to a user regarding update of software to an electronic control unit installed in a vehicle, the notification system comprising:
the vehicle;
an information processing device; and
a server that transmits the approval request to each of the vehicle and the information processing device, wherein:
one of the vehicle and the information processing device is configured to, when a predetermined operation for the approval request is received, transmit an operation result of the predetermined operation to the other of the vehicle and the information processing device without going through the server; and
the other of the vehicle and the information processing device is configured to, when the operation result from the one of the vehicle and the information processing device is received, perform control for withdrawing the approval request received by the other of the vehicle and the information processing device.

10. A non-transitory storage medium storing a program that is executable by one or more processors and that causes a vehicle to function as the vehicle according to claim 1.

11. A non-transitory storage medium storing a program that is executable by one or more processors and that causes an information processing device to function as the information processing device according to claim 5.

* * * * *